United States Patent
Maleta et al.

(10) Patent No.: US 8,333,940 B2
(45) Date of Patent: Dec. 18, 2012

(54) MASS-EXCHANGE CONTACT DEVICE

(76) Inventors: Bogdan Maleta, Yagotin (UA); Olesia Maleta, Yagotin (UA)

(*) Notice: Subject to any disclaimer, the term of this patent is extended or adjusted under 35 U.S.C. 154(b) by 410 days.

(21) Appl. No.: 12/800,176

(22) Filed: May 10, 2010

(65) Prior Publication Data

US 2010/0219060 A1    Sep. 2, 2010

Related U.S. Application Data (63) Continuation-in-part of application No. 12/227,991, filed as application No. PCT/UA2007/000038 on Jun. 7, 2007, now abandoned.

(30) Foreign Application Priority Data

Jun. 13, 2006 (UA) .............................. 2006/06612
Mar. 2, 2009 (UA) .............................. 200901774
Feb. 22, 2010 (WO) ............... PCT/UA2010/000005

(51) Int. Cl.
   *B01J 8/04*     (2006.01)
   *B01D 3/18*     (2006.01)
(52) U.S. Cl. ........ 422/607; 422/638; 422/648; 422/310; 261/114.4; 202/158
(58) Field of Classification Search ............. 422/607, 422/638, 648, 310; 261/114.4; 202/158
See application file for complete search history.

(56) References Cited

U.S. PATENT DOCUMENTS

| | | | | |
|---|---|---|---|---|
| 2,428,889 A | * | 10/1947 | Nutter | 261/114.2 |
| 2,871,003 A | * | 1/1959 | Galbreath | 261/114.2 |
| 3,618,913 A | * | 11/1971 | Schramm | 261/114.4 |
| 4,290,981 A | * | 9/1981 | Schramm | 261/114.4 |
| 4,642,223 A | * | 2/1987 | Al-Saigh | 422/607 |
| 8,158,073 B2 | * | 4/2012 | Maleta et al. | 422/211 |

FOREIGN PATENT DOCUMENTS

RU    2237508 C1 * 10/2004

\* cited by examiner

*Primary Examiner* — Jennifer A Leung
(74) *Attorney, Agent, or Firm* — Aleksandr Smushkovich (57) ABSTRACT

A mass-exchange contact device is proposed, comprising upper and lower flat ring-shaped trays attached to a column, a sleeve having windows with bottom edges in the plane of the lower tray, a barbotage unit having orifices in its sidewalls placed on the top sleeve, a movable double-acting valve including upper and lower plates connected with a rod. The barbotage unit includes an ascending limiter of valve's movement, the sleeve's bottom includes a descending limiter. Alternatively, the barbotage unit is made as a portion of the sleeve. Embodiments comprise a number of rows of the proposed devices situated one above the other, and separated by multi-layer packing fittings. The devices can be used in catalytic distillation columns, wherein the fittings are filled with catalytic material. Alternatively, the fitting is substituted with a grating supporting a catalytic granular layer. The proposed design improves device operation, reliability, durability, reduces its weight and costs.

7 Claims, 9 Drawing Sheets

MASS-EXCHANGE CONTACT DEVICE

CROSS-REFERENCE TO RELATED APPLICATIONS

This U.S. patent application is a continuation-in-part application of a U.S. patent application Ser. No. 12/227,991 (herein further referred to as "parent application") filed on 4 Dec. 2008, entitled "Mass-Exchange Contact Device", being a U.S. national phase application of a PCT application PCT/UA2007/000038 filed on 7 Jun. 2007, published as WO2007/145604, which PCT application claims priority of a Ukrainian patent application UA2006/06612 filed on 13 Jun. 2006. This continuation-in-part application also claims priority of another PCT application PCT/UA2010/000005 filed on 22 Feb. 2010, claiming priority of a Ukrainian patent application UA200901774 filed on 2 Mar. 2009. The foregoing PCT applications and Ukrainian applications are hereby entirely incorporated by reference. The U.S. patent application Ser. No. 12/227,991 (parent application) is hereby expressly abandoned.

FIELD OF THE INVENTION

The invention relates to mass exchange contact devices, manly to the devices used for performing mass exchange processes in a gas (vapor)-liquid system in the conditions of a cyclic mode at separate movements of the gas/liquid phases in conventional columns, and also in catalytic distillation columns. It can be used in the food, chemical, petrochemical, oil-processing, and other industries.

BACKGROUND OT THE INVENTION

There is known a mass exchange contact device comprising a plate face with contact elements. The plate face includes ring-shaped holes with cross-pieces, which holes are disposed along the periphery of the contact elements. A central hole is disposed under the contact element, a branch pipe and a ring are mounted on the axe of central hole. The ring is equipped with a movable double-acting valve arranged in the middle thereof. The valve is made of plates with central holes, wherein the plates are connected by means of distance poles. The upper hole is used for passing the branch pipe. An interrupting valve is mounted on a rod situated between limiters of ascending and descending under the lower hole (USSR inventor certificate No 1307643).

The disadvantages of the mentioned device are: it's composed of two movable parts; there is a restriction of the opening cross-section of branch pipe for passing gas (steam), as well as a restriction of the ringed holes' opening cross-section for a liquid flow. These disadvantages increase the plate's hydraulic resistance at the time of gas (steam) passing, and the time of transferring liquid from one plate to another.

There is known a mass exchange contact device ('parent device') described in the currently co-pending U.S. parent application Ser. No. 12/227,991 filed by the instant inventors. The efficiency of the 'parent' device however can be increased by dividing the barbotage space into a number of layers thereby enlarging the mass-exchange surface, which is disclosed herein further.

There is known a U.S. Pat. No. 5,523,062 teaching: "A distribution element is provided which may be used in packed columns to redistribute the gas and liquid flow evenly across the column. Most simply the element comprises a corrugated plate having openings only at the peaks and valleys of the corrugation. There are no openings in the sloped sides of the corrugations. The distribution element is spaced within the packing to most advantageously utilize the redistribution characteristics of the element for a given system." The U.S. Pat. No. 5,523,062 is hereby entirely incorporated by reference.

Another U.S. Pat. No. 6,206,349 describes: "Fluid-fluid contacting apparatus is provided with a structured packing comprising a series of packing elements fabricated from sheets of crimped material in such a way that the corrugations in each sheet extend obliquely with respect to the direction of bulk fluid flow through the apparatus. Each packing element is oriented with the sheets thereof in a plane which is angularly displaced with respect to the sheets of neighboring elements. A mechanism is provided at or in the vicinity of the interface between neighboring elements for reducing the pressure drop imposed on the continuous phase as it passes from one element to the next." The U.S. Pat. No. 6,206,349 is hereby entirely incorporated by reference.

Another U.S. Pat. No. 6,513,795 discloses "A layer of mixed-resistance structured packing includes: a first structured packing having a first packing resistance; and a second structured packing generally horizontally adjacent the first structured packing, the second structured packing having a second packing resistance different than the first packing resistance. The layer of mixed-resistance structured packing is used in exchange columns for exchanging heat and/or mass between a first phase and a second phase in processes such as cryogenic air separation. Use of the layer of mixed-resistance structured packing reduces HETP (height equivalent to a theoretical plate) in the exchange columns and processes. A method also is provided for assembling the layer of mixed-resistance structured packing in an exchange column." The U.S. Pat. No. 6,513,795 is hereby entirely incorporated by reference.

A disadvantage of the above-mentioned devices is that the volatile phase changes its speed along the height of the column due to varying the percentage of the volatile phase. Therefore, the ascending volatile phase flow cannot stably support the liquid phase in a cyclic mode. This leads to the fact that the liquid phase falls down within the lower speed sections of the column, whereas the liquid phase is pushed out within the higher speed sections of the column. Hence, empty zones appear within the structured packing elements, the phases move unevenly, causing low separation efficiency. This prevents arranging an efficient mass-exchange process with separate movements (i.e. in a cyclic mode) of the phases in the column. This disadvantage is conditioned by the fact that the packing element creates a resistance to the liquid phase moving along the mass-exchange tray, and a mass-exchange surface is formed only due to barbotage.

The above-mentioned devices have also another disadvantage of stochastic formation of the mass-exchange surface on the trays, while the liquid is intermingled throughout the whole volume of liquid phase.

A U.S. Pat. No. 4,471,154 teaches "A distillation-reactor for separating constituents of a feedstock having similar boiling points includes at least one stage with containing screens defining a series of containment volumes for a heterogeneous particulate catalyst. The catalyst is fluidized within the volumes defined by the containing screens by the action of vapor passing through the tray. Liquid flowing across the tray intimately contacts the fluidized catalyst and vapor without the occurrence of liquid back-up or high pressure drop." U.S. Pat. No. 4,471,154 is hereby entirely incorporated by reference.

Yet, another U.S. Pat. No. 5,536,699 teaches "The packing having catalytic or adsorbent agents, which is provided for at least one fluid medium, comprises packing elements (10) disposed in stacks, which are assembled from layers aligned along the main direction of flow (2). The layers are formed by packing parts (1), the walls (2) of which are permeable for the medium. The packing parts contain a catalyst material (3).

Between the packing parts are provided flow ducts, which intersect and are open to one another. According to the invention the layers are formed by a plurality of packing parts (1), the packing elements (10) comprise support structures (4) into which the packing parts are inserted, and the packing parts are substantially cylindrical." U.S. Pat. No. 5,536,699 is hereby entirely incorporated by reference.

A shortcoming of the last two patents is that the amount of costly catalyst is high, which makes the devices expensive. However, if one could increase the efficiency of dividing the components and enhance the uniformity of distribution of the catalyst, the required amount of catalyst would be reduced, making the device less expensive. The related art devices also cannot control the speed of chemical reactions, since they don't provide for regulation of the time of introduction of the volatile phase into the column.

BRIEF DESCRIPTION OF THE INVENTION

A first aim of the present invention is the improvement of known mass-exchange devices and methods for mass-exchange between a liquid phase component and a volatile phase component (i.e. gas, vapor, etc. having a predetermined concentration that varies during the process) in light of the aforementioned deficiencies of the related art devices.

A second aim of the present invention is the reduction of the height of the column, and the metal content (amount of metal consumed for making the device) of the column, and costs of the column, increasing the reliability and durability of device operation. Other aims of the invention may become apparent to a skilled artisan upon learning the present disclosure.

The aforesaid aims are achieved particularly by providing an ordered alteration of the concentration of the volatile phase component along the height of the liquid phase layer and providing a predeterminedly extensive mass-exchange surface in the inventive mass-exchange contact device.

In a first embodiment (according to U.S. patent application Ser. No. 12/227,991), the 'parent' mass exchange contact device comprises: an essentially flat ring-shaped upper tray attached with its outward edge to a rectification column's walls; a cylindrical sleeve attached to the inward edge of the upper tray, the sleeve includes a top opening, and a bottom opening with a ring-shaped descending limiter surrounding the bottom opening; the sleeve includes a plurality of vertically extended windows made in its sidewalls so that the top edges of the windows are situated at the plane of upper tray, the sleeve is attached to the inward edge of the upper tray; a cylindrical barbotage unit disposed immediately above the plane of upper tray and coupled with the top edge of the sleeve, the barbotage unit includes a ring-shaped ascending limiter surrounding its top opening thereof, the barbotage unit includes a plurality of orifices on its sidewalls (in alternative embodiments, the barbotage unit is made as a portion of the sleeve); an essentially flat ring-shaped lower tray outwardly attached to the column and inwardly attached to the sleeve, the lower tray is situated at the plane of the bottom edges of the windows; a movable double-acting (two-way or bidirectional) valve including a lower flat disc-shaped plate and an upper flat disc-shaped plate, both the plates are slidely fitted into the sleeve, the valve also includes a rod axially connecting the centers of upper and lower plates, the upward movement of the valve is restricted by the ascending limiter, and the downward movement of the valve is restricted by the descending limiter; wherein the upper plate functions as a contact element between the steam and the liquid phases. In a preferred embodiment, the height of the windows is chosen equal to the height of the double-acting valve.

In a second embodiment, the inventive method utilizes a plurality of inventive mass exchange contact devices, described in the first embodiment, which devices are vertically stacked above each other in a rectification or similar column, and the contact devices each is combined with a packing means in the form of a multi-layer packing fitting (e.g. the ones mentioned in the related art patents hereinabove, or similar) disposed above the corresponding contact device, wherein the mass-exchange between the liquid and volatile phases is conducted within the packing fitting. Each such multi-layer packing fitting is preferably configured as a corrugated member having peaks and valleys.

In a third embodiment, the inventive method utilizes a plurality of inventive mass exchange contact devices, described in the first embodiment, which devices are stacked above each other in a column wherein a catalytic distillation takes place, and the contact devices each is combined with a packing means in the form of a multi-layer packing fitting disposed above thereof, wherein the mass-exchange between the liquid and volatile phases is conducted within the packing fitting. Each such multi-layer packing fitting contains any suitable conventional catalytic material. Each such multi-layer packing fitting is preferably configured as a corrugated member having peaks and valleys.

In a fourth embodiment, the inventive method utilizes a plurality of inventive mass exchange contact devices, described in the first embodiment, which devices are vertically stacked above each other in a column wherein a catalytic distillation takes place, and the contact devices each is combined with a grating disposed above thereof and a granular layer of catalytic material placed on the grating, wherein the grating has holes of a predetermined size, and the granules of catalytic material have a minimal size greater than the predetermined size of the grating's holes. Any suitable conventional catalytic material can be utilized in the device.

Each reference numeral indicated on the drawings is designated to an element of the inventive structure described herein below. A first time introduced reference numeral in the description is enclosed into parentheses.

DETAIL DESCRIPTION OF PREFERRED EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

First Embodiment

Parent

Figure 1:
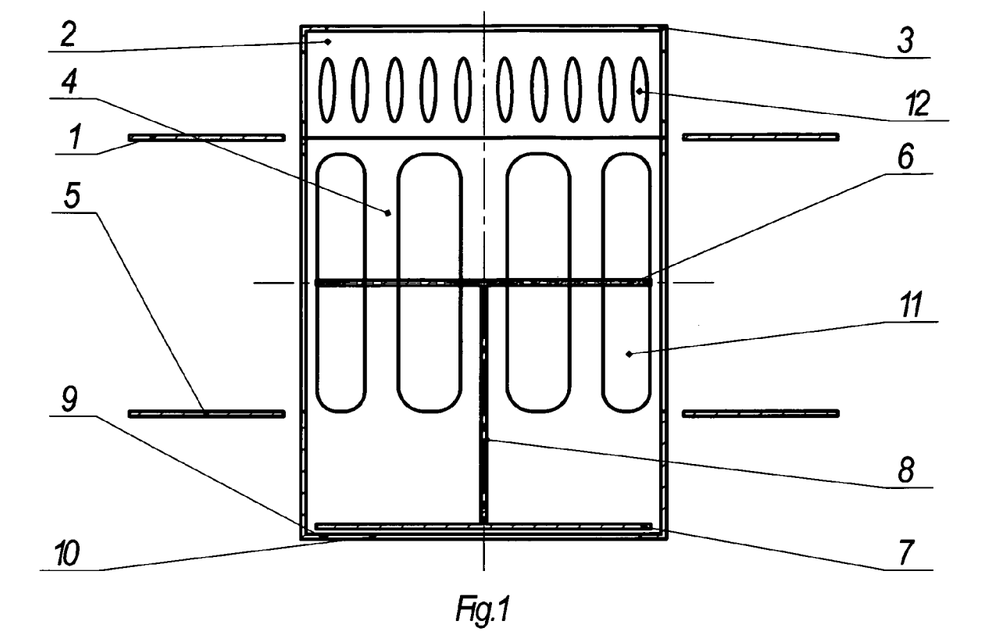
FIG. 1 is a view showing the mass exchange contact device at an initial moment of supplying the volatile phase, according to a preferred embodiment of the parent application Ser. No. 12/227,991.
Figure 2:
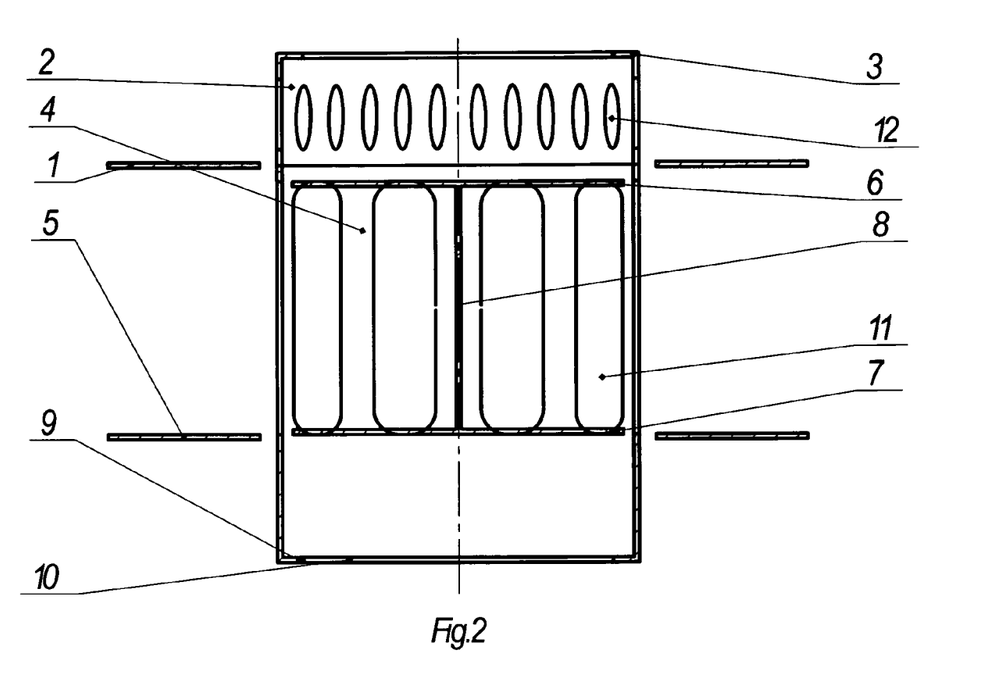
FIG. 2 is a view showing the device at the moment of altering the exertion of lifting force from the lower plate to the upper plate of the valve, according to the preferred embodiment shown on FIG. 1.
Figure 3:
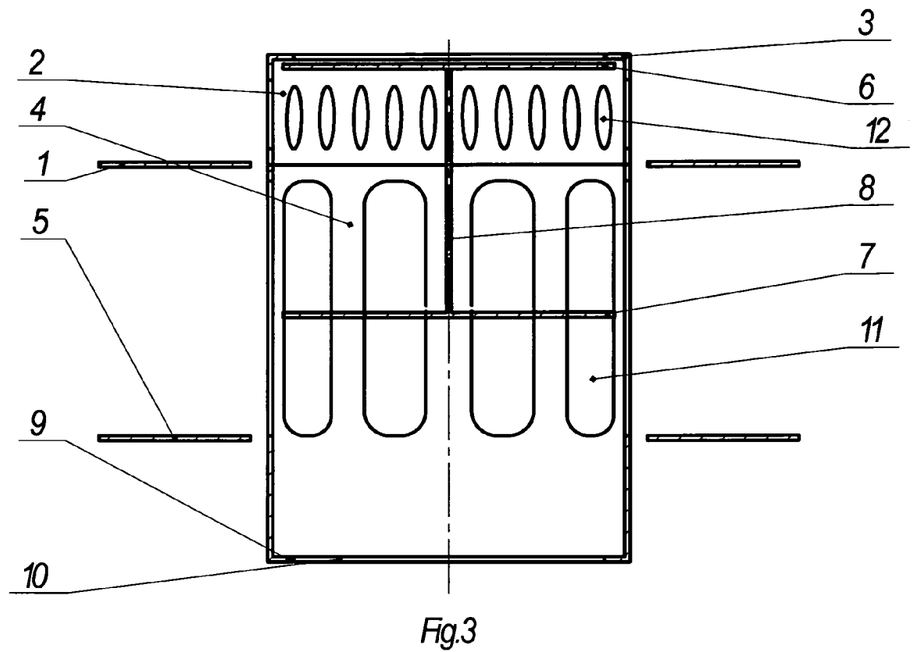
FIG. 3 is a view showing the mass exchange contact device at a position corresponding to the subsequent moments of supplying the volatile phase, according to the preferred embodiment shown on FIG. 1.

As illustrated on FIGS. 1,2,3, according to the parent embodiment (disclosed in the U.S. patent application Ser. No. 12/227,991), the inventive mass-exchange contact device comprises an essentially flat ring-shaped upper tray (1) attached with its outward edge to the walls of a conventional rectification column (not illustrated in FIGS. 1,2,3).

The inventive device comprises a cylindrical sleeve (4) attached to the inward edge of the upper tray 1, the sleeve 4 includes a top opening with a ring-shaped ascending limiter (3) surrounding the top opening, and a bottom opening (10) with a ring-shaped descending limiter (9) surrounding the bottom opening. The limiters 3 and 9 can be made as folded edges of the sleeve 4. The sleeve 4 includes a plurality of vertically extended windows (11) made in its sidewalls so that the top edges of the windows 11 are situated in the plane of upper tray 1. The sidewalls of sleeve 4 in their upper region are attached to the inward edge of the upper tray 1.

The inventive device comprises a barbotage unit (2) disposed immediately above the plane of upper tray 1. The barbotage unit 2 has a cylindrical shape with an open top and an open bottom connected with the top opening of the sleeve 4. The barbotage unit 2 includes a plurality of orifices (12) on its sidewalls. In alternative embodiments (not illustrated), the barbotage unit is made as a portion of the sleeve 4.

The inventive device comprises an essentially flat ring-shaped lower tray (5) outwardly attached to the column and inwardly attached to the lower portion of sidewalls of the sleeve 4. The lower tray 5 is situated in the plane of the bottom edges of the windows 11. The tray 1, the corresponding side portion of the column, and the tray 5 form a closed space ('transitional space') for receiving steam during operation of the device.

The inventive device comprises a movable double-acting (two-way or bidirectional) valve including a lower flat disc-shaped solid plate (7) and an upper flat disc-shaped solid plate (6), the plates 6 and 7 are slidely fitted into the sleeve 4. The valve includes a rigid distance rod (8) axially connecting the centers of the upper plate 6 and lower plate 7. The upward movement of the valve is restricted by the ascending limiter 3, and the downward movement of the valve is restricted by the descending limiter 9; wherein the upper plate 6 functions as a contact element between the steam and the liquid phases.

In preferred embodiments, the height of the windows 11 is chosen equal to the height of the double-acting valve. The column may contain a predetermined number of such mass-exchange devices.

The inventive device operates in the following manner: at a 'steam' period of the process, the pressure of the steam (gas) phase lifts the double-acting valve up to the upper position, so that the upper plate 6 shuts the top of barbotage unit 2, which upper plate 6 is functioning at the moment as a contact element between the steam and liquid phases. The steam flow, passing under the plate 6, via the orifices 12 interacts with the liquid situated on the tray 1.

At the end of the 'steam' period, the valve moves down under the action of its own weight and the weight of liquid, decelerates at the level of tray 1, and mildly descends on the limiter 9. The delay time for the steam flow is determined by the time necessary for transfer of the liquid portion from the tray 1 into the transitional space, and is about several seconds.

At the initial moment of action of steam, a lifting force is upwardly exerted to the lower plate 7 caused by a pressure difference (FIG. 1). At the moment when the plate 7 is lifted to the level of tray 5 (bottom edge of the windows 11), the lifting force changes its point of application, and is exerted to the upper plate 6 (FIG. 2), while the maximum possible pressure difference is still kept. The steam flow passes the orifices 12, and barbotates through the liquid.

Since the passing cross-sections of the windows 11 are increased during the process, the speed of steam flow decreases that facilitates a transfer of liquid to the mass-exchange device situated below the given device in the column. Meanwhile, the valve moves up to the uppermost position determined by the level of limiter 3. The weight of the valve and the portion of liquid thereupon must be less than the pressure difference force applied to the upper plate 6.

The time of liquid transfer from the given mass-exchange device to the one located below in the column is called a 'liquid' period. The cycles consisting of the 'steam' and 'liquid' periods are analogously repeated.

The proposed design of the device allows conducting mass-exchange processes in a steam (gas)-liquid system in a cyclical mode under one-time delay of liquid simultaneously in all mass-exchange devices of a column, extending the operating range of liquid and steam loads, increasing the productivity, reliability, and durability of the devices. Application of such mass-exchange contact devices removes the necessity of intermingling the liquid on the contact adjacent stages and allows raising the mass-exchange effectiveness by two-three times comparatively with a stationary process.

Second Embodiment

Continuation

A common problem of the related art devices (as well as of the device of the first embodiment) can be described as follows: an ideal mass-exchange process for separate movements of the liquid and volatile phases envisages a 100% intermingling of the phases during the introduction of the volatile phase, whose concentration changes during the mass-exchange process. In case of the 100% intermingling, the change of concentration $x_n$ of the volatile phase occurs during a time t of passage of the volatile phase throughout an entire volume of the liquid phase according to a dependence of $dx_n/dt$. However, if one could orderly alter the concentration of the volatile phase along a height (z) of the liquid phase component, it would lead to an increase of the efficiency of separation of the liquid and volatile components on the mass-exchange tray according to a dependency of $d^2x_n/dtdz$.

This problem is herein solved in the second embodiment of inventive device/method for improvement of mass-exchange between a volatile phase and a liquid phase within a conventional column having internal walls, by means of: providing a plurality of mass exchange contact devices, each such device is furnished with barbotage means for barbotage of the volatile phase and the liquid phase, wherein the mass exchange contact devices are designed according to the first embodiment (i.e. U.S. Ser. No. 12/227,991); the contact devices are arranged in a number of substantially horizontally situated rows, the rows each is disposed in the column at a predetermined level (i.e. one row above the other), and the rows are separated from each other with a packing fitting; i.e. the packing fittings each is mounted above the corresponding row of contact devices; each such packing fitting comprises a plurality of layers situated one above the other; the contact devices are joined by the upper and lower trays common for each such row, and the trays are coupled substantially to the internal walls of the column.

The second embodiment of inventive device/method provides for operative separating the liquid phase into several individual layers, which allows orderly altering the concentration of the volatile phase during its passage through each such individual layer. The use of the packing fittings allows creating the aforesaid conditions for separating the liquid phase into the individual layers. This also enlarges the surface area between the liquid and volatile phases, ascertained by a constant contact surface of the fitting. The second embodiment of the method allows arranging separate movements of the phases that excludes a crossover flow of the liquid phase between the contact devices within the column during the mass-exchange process (i.e. when the volatile phase is introduced). All these factors contribute to the improvement of mass-exchange between the volatile and liquid phases and enhance the process efficiency.

Figure 4:
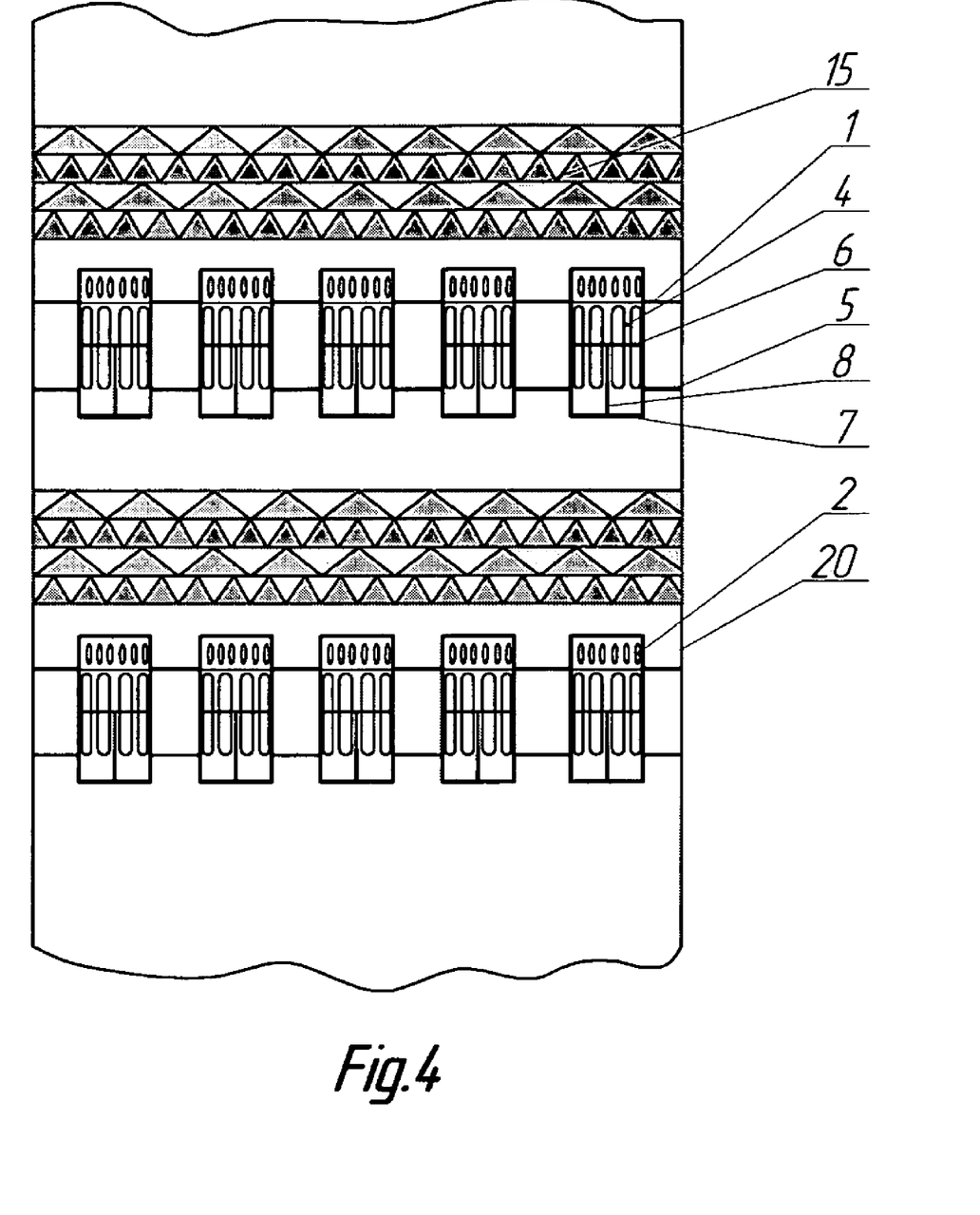
FIG. 4 shows a schematic sectional view of a column containing an upper plurality and a lower plurality of mass exchange contact devices taught in the parent application Ser. No. 12/227,991, wherein each of the pluralities is combined with a packing fitting placed above thereof, according to an embodiment of the present invention, wherein the volatile phase is not introduced.
Figure 5:
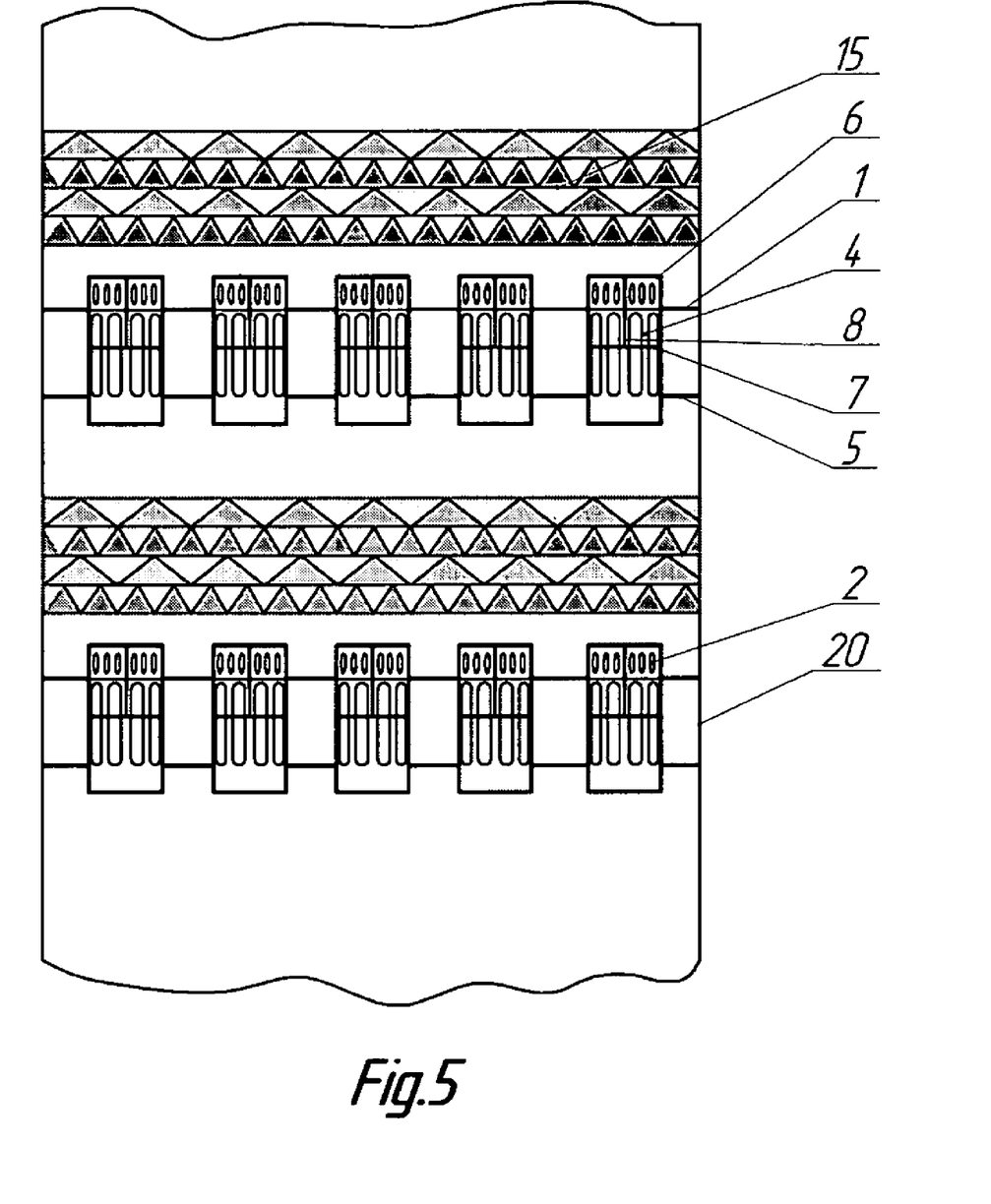
FIG. 5 shows a schematic sectional view of the embodiment of the present invention shown on FIG. 4, wherein the volatile phase is introduced.

Referring to preferred examples of the second embodiment of the present invention, illustrated on FIGS. 4 and 5, a conventional column (20) supports at least two pluralities (substantially horizontally disposed rows) of mass exchange contact devices designed according to the first embodiment, (i.e. according to the U.S. patent application Ser. No. 12/225,575, depicted on FIG. 1). FIGS. 4 and 5 show an upper row and a lower row mounted within the column 20. Each mass exchange contact device includes the barbotage unit 2 located in the top portion of the device, the tops of every barbotage unit 2 of the same row of contact devices are secured to a common upper tray 1. Each contact device includes the sleeve 4 located below the barbotage unit 2, the bottoms of every sleeve 4 of the same row is secured to a common lower tray 5.

In the second embodiment illustrated on FIGS. 4 and 5, the rows of contact devices are disposed in the column 20 one above the other, and separated from each other with a packing fitting (15). Each packing fitting 15 comprises a plurality of layers situated one above the other. Preferably, the layers are configured as members having a corrugated profile.

In the column 20, a mass-transfer surface is formed due to barbotage operatively taking place in the packing fitting 15. The mass-transfer surface is formed in a process of barbotage of the volatile phase through the liquid phase, which process has a stochastic character. Distinctly from the columns that contain known packing fittings, the combination of the inventive contact devices, according to the first embodiment, with the packing fittings 15 (where the crossover flows between the contact devices are absent during the volatile phase introduction), the fittings 15 can perform another novel function, as explained below.

In an initial cycle, at the time of introduction of the volatile phase into the column (shown on FIG. 5), a zone of contact of the phases is located in the fitting 15. The bi-directional valves are in their uppermost position. A transitional volume formed between the upper tray 1 and the lower tray 5 is empty.

At the time of absence of the volatile phase, wherein the liquid is flowing, the bi-directional valves descend into their lowest position (shown on FIG. 4) due to gravitation. The liquid phase flows from the fitting 15 into the transitional volume.

In the next cycle, the volatile phase lifts the bi-directional valves into their uppermost position (shown on FIG. 5), while the liquid phase flows over from the transitional volume into the fittings 15 of the contact devices of the below-positioned plurality. If the contact surface is constant, the volume of liquid is proportional to the height of the layer of liquid.

According to the known material balance equation, a change of concentration $dx_n/dt$ of the volatile component on a contact surface during the time of introduction of the volatile component is reversely proportional to the amount of liquid component brought into contact therewith:

$$dx_n/dt = -G/H^*(y_n - y_{n-1}).$$

If one divides the liquid component exemplarily into four layers, which layers are not being mixed, the $dx_n/dt$ value will be 4 times greater than for the whole volume of liquid on the contact surface. Therefore, the resultant change of concentration of the liquid component will be greater where the concentration is so altered along the height of liquid layer.

Thusly, the second embodiment of the invention allows increasing the efficiency of separation of the liquid and volatile components on the tray, decreasing energy consumed for the process, and reducing the content of metal in the columns.

Third Embodiment

Continuation

The third embodiment of inventive device/method is provided for improvement of mass-exchange between a volatile phase and a liquid phase, wherein the mass-exchange takes place simultaneously with a catalytic distillation process within the same column. The third embodiment is illustrated on FIGS. 6 and 7. The third embodiment basically includes elements identical to the elements of the second embodiment. However, according to the third embodiment, the space between the layers of package fittings 15 is filled out with a suitable conventional catalytic material (16).

Figure 6:
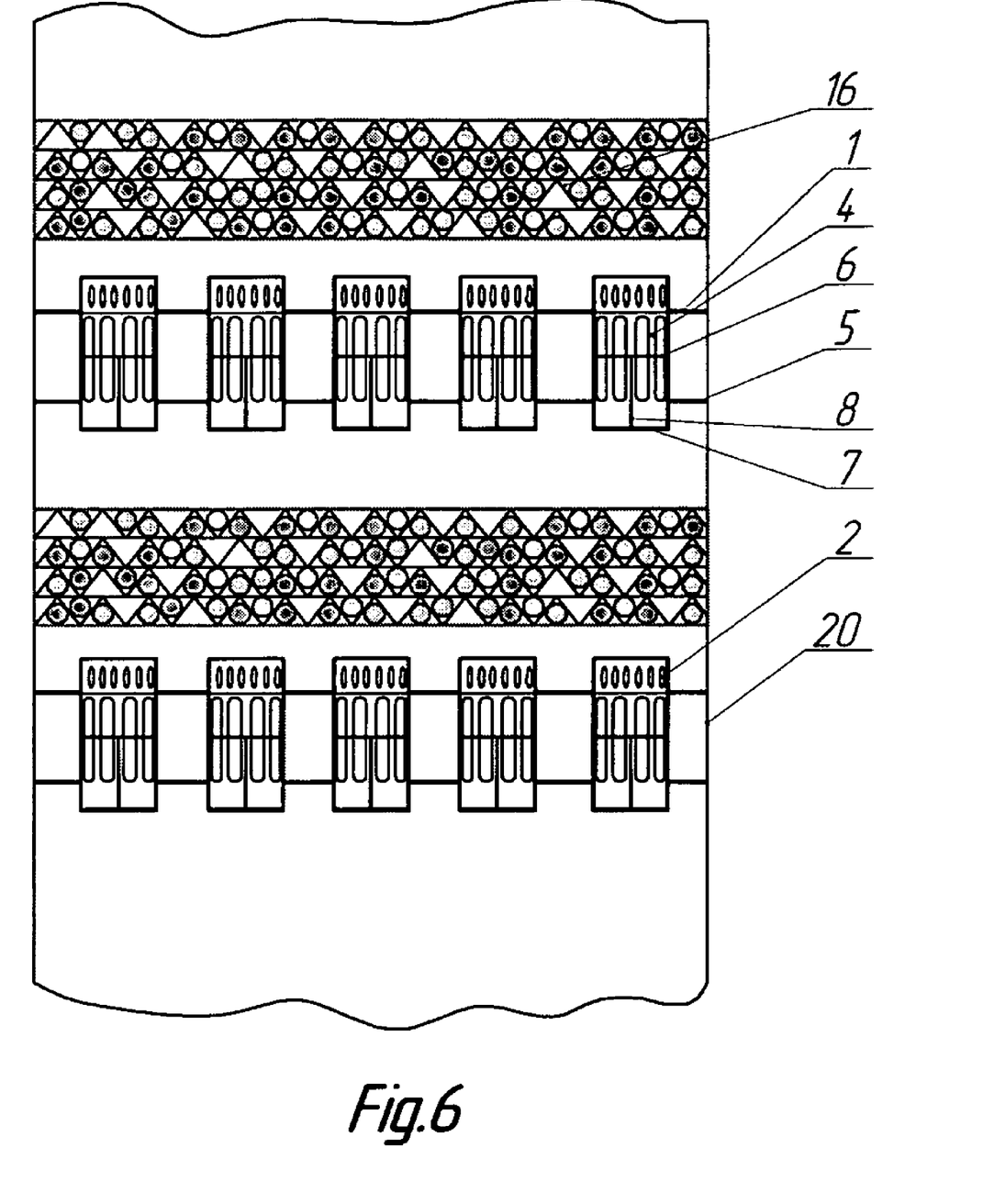
FIG. 6 shows a schematic sectional view of a column containing an upper plurality and a lower plurality of mass exchange contact devices (taught in the U.S. patent application Ser. No. 12/227,991), wherein each of the pluralities is combined with a packing fitting placed above thereof, and containing a catalytic material, according to an embodiment of the present invention, wherein the volatile phase is not introduced.
Figure 7:
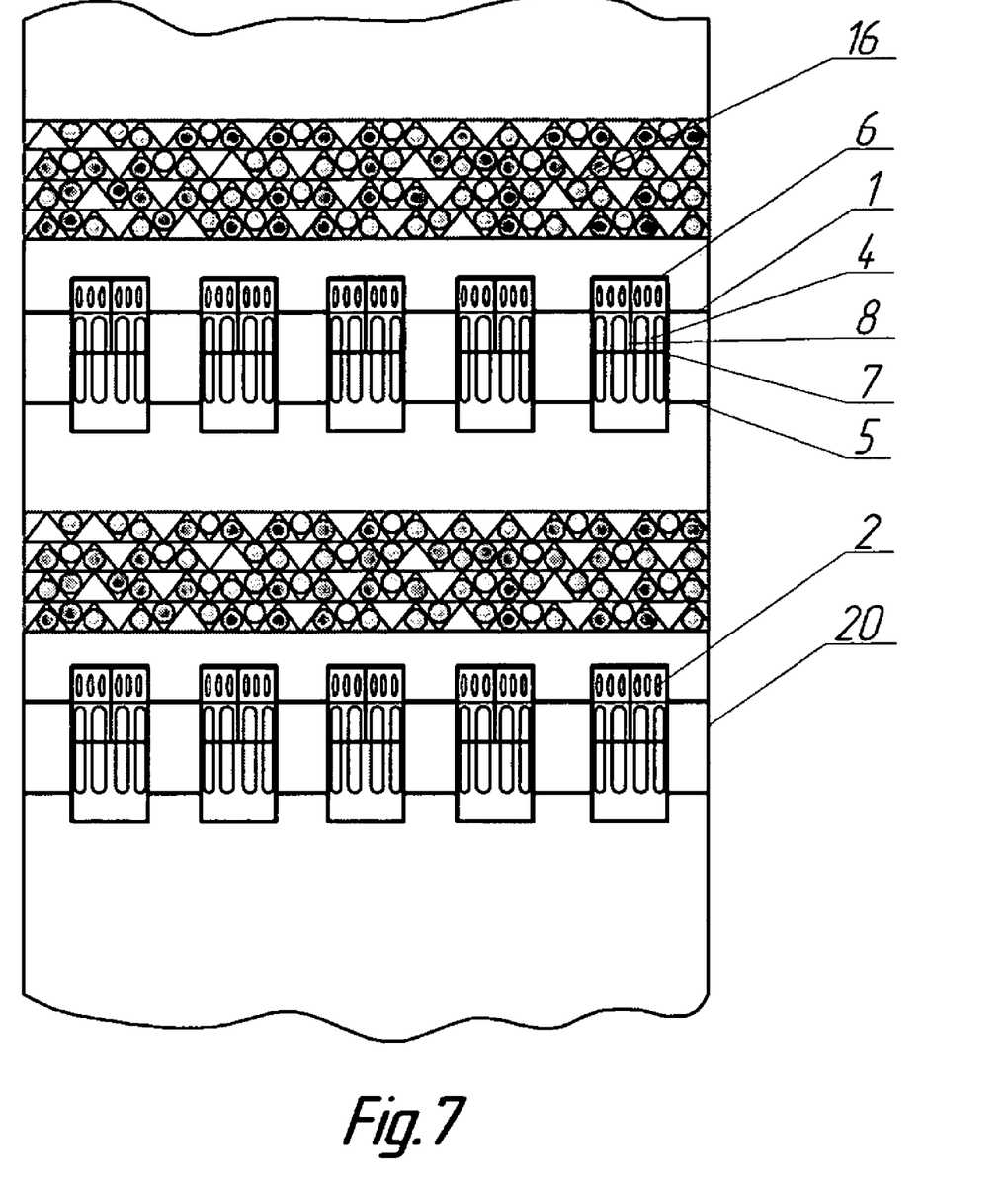
FIG. 7 shows a schematic sectional view of the embodiment of the present invention shown on FIG. 6, wherein the volatile phase is introduced.

A column 20 (FIGS. 6 and 7) contains an upper row and a lower row of mass exchange contact devices, designed according to the first embodiment (taught in the U.S. patent application Ser. No. 12/227,991), wherein each of the rows is combined with a packing fitting 15 placed above thereof, and containing the catalytic material 16. FIG. 6 shows the state wherein the volatile phase is not introduced, whereas FIG. 7 shows the state wherein the volatile phase is introduced.

Fourth Embodiment

Continuation

Figure 8:
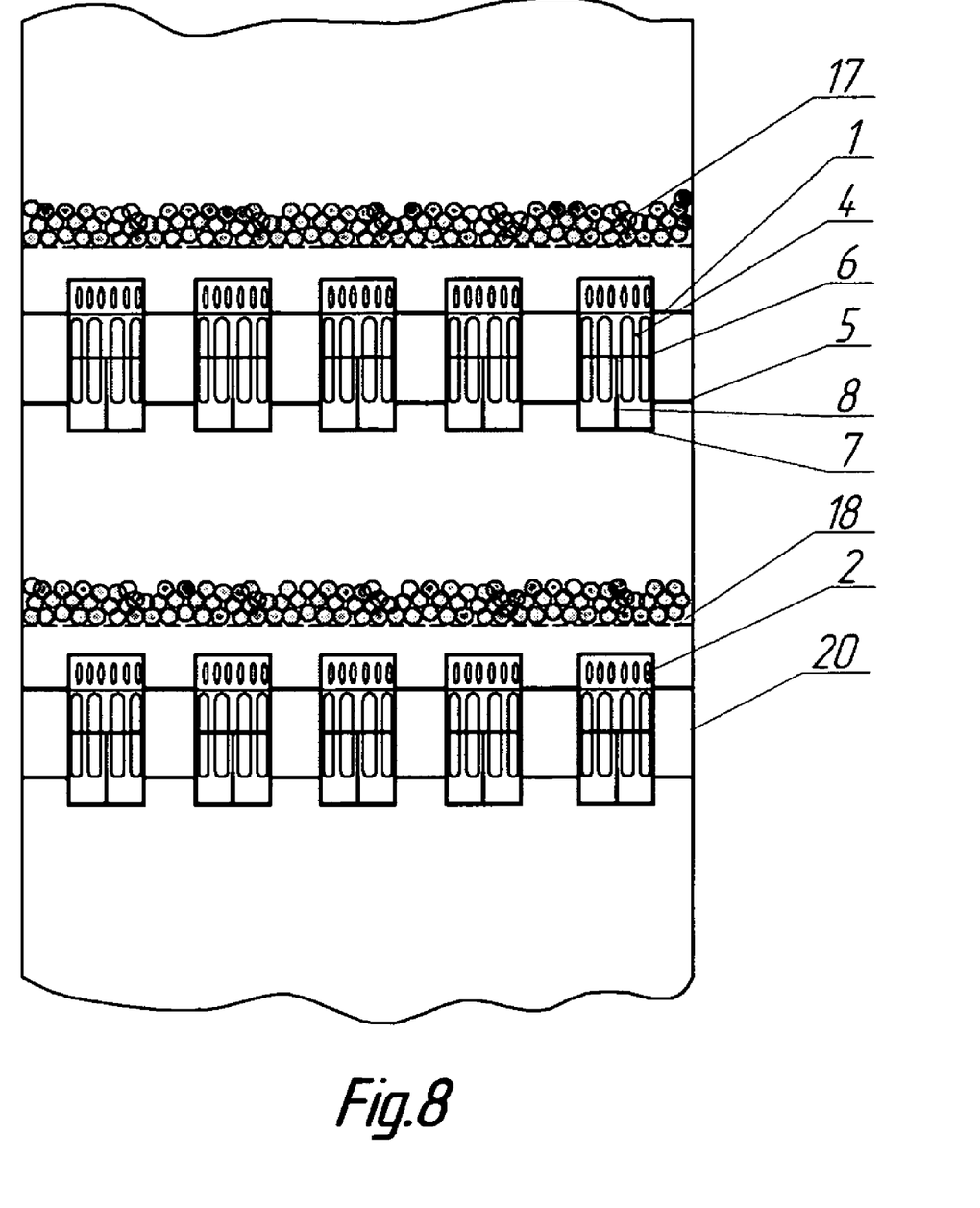
FIG. 8 shows a schematic sectional view of a column containing an upper plurality and a lower plurality of mass exchange contact devices (taught in the U.S. patent application Ser. No. 12/227,991), wherein each of the pluralities is combined with a grating disposed above thereof and a granular layer of catalytic material placed on the grating, according to an embodiment of the present invention, wherein the volatile phase is not introduced.
Figure 9:
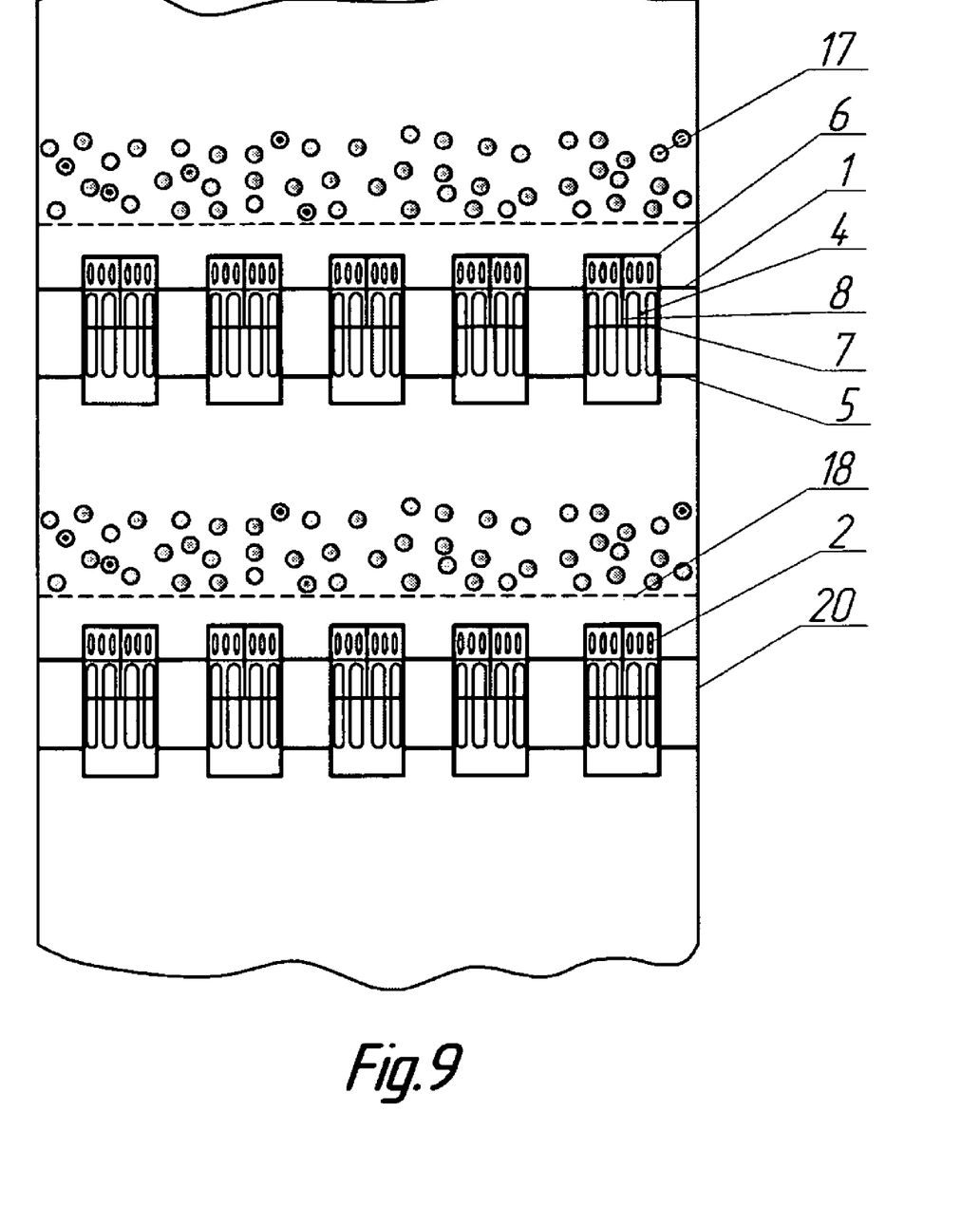
FIG. 9 shows a schematic sectional view of the embodiment of the present invention shown on FIG. 8, wherein the volatile phase is introduced.

The fourth embodiment of inventive device/method for improvement of mass-exchange between a volatile phase and a liquid phase, shown on FIGS. 8 and 9, solves the same problem as the third embodiment does, though, in a different way. The fourth embodiment basically includes elements identical to the elements of the second embodiment, except for the package fittings 15, not included in the fourth embodiment of inventive device.

A column 20 contains an upper row and a lower row of mass exchange contact devices designed according to the first embodiment (taught in the U.S. patent application Ser. No.

12/227,991), wherein each of the rows is combined with a grating (18) disposed above thereof and a granular layer (17) of catalytic material placed on the grating 18. The grating 18 has holes of a predetermined size, and the granular layer 17 consists of granules with a minimal size greater than the predetermined size of holes of the grating 18.

FIG. 8 shows the state wherein the volatile phase is not introduced. The layer 17 lies on the grating 18. FIG. 9 shows the state wherein the volatile phase is introduced. The liquid from the above-mounted device gets into the space of boiling catalyst of the lower-mounted device. The speed of flow of the volatile phase in the column should be maintained within a range for boiling the catalyst. At the end of the cycle, the layer 17 falls back on the grating 18 due to gravitation.

We claim:

1. A mass-exchange contact device for mass-exchange of a steam (gas) phase and a liquid phase arranged in a column, said device comprising:
    an essentially flat ring-shaped upper tray outwardly attached to the walls of the column;
    a cylindrical sleeve attached to the inward edge of said upper tray, said sleeve including a top opening with an ascending limiter, and a bottom opening with a descending limiter;
    said sleeve including a plurality of windows made in its sidewalls so that the top edges of said windows are situated in the plane of said upper tray, the upper portion of said sleeve's sidewalls is attached to the inward edge of said upper tray;
    a barbotage unit disposed above the plane of said upper tray; said barbotage unit having a cylindrical shape with an open top and an open bottom connected with the top opening of said sleeve, said barbotage unit including a plurality of orifices on its sidewalls;
    an essentially flat ring-shaped lower tray outwardly attached to the column and inwardly attached to the lower portion of said sleeve's sidewalls, said lower tray is situated in the plane of the bottom edges of said windows; and
    a movable double-acting valve including a lower flat disc-shaped solid plate and an upper flat disc-shaped solid plate, said lower and upper plates are slidely fitted into said sleeve, said valve including a distance rod axially connecting the centers of said lower and upper plates;
    wherein the upward movement of said valve is restricted by said ascending limiter, and the downward movement of said valve is restricted by said descending limiter, and said upper plate functions as a contact element between the steam and the liquid phases.

2. The mass-exchange contact device according to claim 1, wherein the height of said windows is equal to the height of said valve.

3. A mass-exchange contact device for mass-exchange of a steam phase and a liquid phase in a column, said device comprising:
    an essentially flat ring-shaped upper tray outwardly attached to the walls of the column;
    a cylindrical sleeve attached to the inward edge of said upper tray, said sleeve including a bottom opening with a descending limiter; said sleeve including a plurality of windows made in its sidewalls so that the top edges of said windows are situated in the plane of said upper tray, the upper portion of said sleeve's sidewalls is attached to the inward edge of said upper tray; said sleeve including a barbotage portion disposed in the top region of said sleeve above the plane of said upper tray, said barbotage portion having a cylindrical shape with an open top coupled with an ascending limiter, said barbotage portion including a plurality of orifices on its sidewalls;
    an essentially flat ring-shaped lower tray outwardly attached to the column and inwardly attached to the lower portion of said sleeve's sidewalls, said lower tray is situated in the plane of the bottom edges of said windows; and
    a movable double-acting valve including a lower flat disc-shaped solid plate and an upper flat disc-shaped solid plate, said lower and upper plates are slidely fitted into said sleeve, said valve including a distance rod axially connecting the centers of said lower and upper plates;
    wherein the upward movement of said valve is restricted by said ascending limiter, and the downward movement of said valve is restricted by said descending limiter, and said upper plate functions as a contact element between the steam and the liquid phases.

4. The mass-exchange contact device according to claim 3, wherein the height of said windows is equal to the height of said valve.

5. A combination of a plurality of mass-exchange contact devices according to claim 1 arranged in a column, said combination comprising:
    at least two substantially horizontally disposed rows of said plurality of mass-exchange contact devices, each said row is situated at a predetermined level in the column, and is supported by said upper and lower trays common for each said mass-exchange contact device of one said row, said upper and lower trays are fixed to said column; and
    a number of packing fittings supported by said column, each of said packing fittings is disposed above one of said rows, wherein each said packing fitting comprises a plurality of layers situated one above the other.

6. The combination according to claim 5, wherein said column is a catalytic distillation column, and wherein said packing fittings are filled with a catalytic material placed between said layers.

7. A combination of a plurality of mass-exchange contact devices according to claim 1 arranged in a catalytic distillation column, said combination comprising:
    at least two substantially horizontally disposed rows of said devices, each said row is situated at a predetermined level in the column, and is supported by said upper and lower trays common for each said device of one said row, said upper and lower trays are fixed to said column;
    a number of gratings, each disposed above one of said rows, each said grating has holes of a predetermined size; and
    a number of granular layers of catalytic material, each said granular layer is placed on a corresponding grating of said number of gratings; and each of said granular layers consists of granules with a minimal size greater than the predetermined size of said holes.

* * * * *